Sept. 2, 1924.

G. GOMAND

BALANCED SLUICE VALVE

Filed June 26, 1922

INVENTOR:
Gabriel Gomand
BY
ATTORNEY

Patented Sept. 2, 1924.

1,507,280

UNITED STATES PATENT OFFICE.

GABRIEL GOMAND, OF BARCELONA, SPAIN.

BALANCED SLUICE VALVE.

Application filed June 26, 1922. Serial No. 570,981.

*To all whom it may concern:*

Be it known that I, GABRIEL GOMAND, citizen of the Republic of France, and resident of Barcelona, Spain (post-office address Apartado 261), have invented a new and useful Balanced Sluice Valve, which improvements are fully set forth in the following specification.

The present invention has for its object to provide a balanced sluice valve in which the effects of the pressure are fully eliminated, and balance automatically obtained, without the intervention of any mechanical means, and which is not liable to get out of balance even should the valve remain unsupported or become damaged.

The invention relates primarily to sluice valves of the type disclosed in my prior French Patent No. 523,476, issued April 22, 1921, but essentially involves certain developments of, and improvements on, the earlier construction; the purpose being to balance the weight of the valve and its operating rod and to eliminate shocks due to the action of the down-stream current.

According to my present invention, and to effect the first of the advantages just specified, I construct the valve-operating rod with a lower portion of reduced diameter. The purpose of this is to provide for a graduation of the upward reaction exerted on the lower portion of the rod, so that such reaction shall in all cases be equal to the combined weight of the valve and rod, less the displacement of the valve and the submerged portion of the rod. The matter is of special importance when dealing with high pressures because the surface of the annular shoulder thereby formed, and which is determined in accordance with the pressure to be used, can be utilized to obtain a perfect balance.

The other improved feature referred to, comprises the formation of the lower part of the valve proper with a depending extension or prolongation which has the shape of a prow or cut-water in cross-section and which projects in a down-stream direction. This cut-water is therefore opposed to the back pressure offered by the down-stream current, which latter is thus split in two, with resultant decrease in load losses. The construction is designed primarily for use in connection with abnormally high stream speeds.

The invention is illustrated in the accompanying drawings, which represent various embodiments thereof, but it is to be clearly understood that the different views which show complete constructions are not intended to indicate separate forms or modifications of the invention but, rather, the different developments or stages thereof, so to say.

Figure 1:
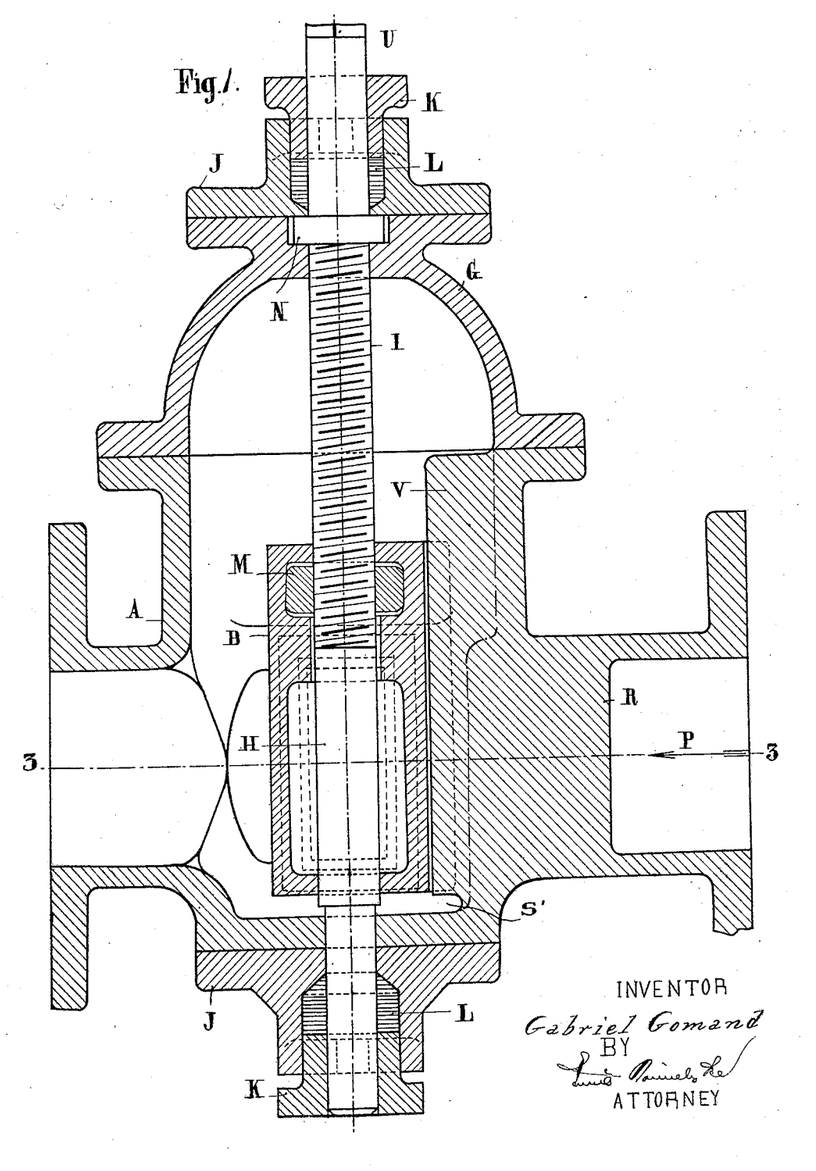
Figure 1 is a central vertical sectional view of the invention showing the first improvement mentioned.
Figure 2:
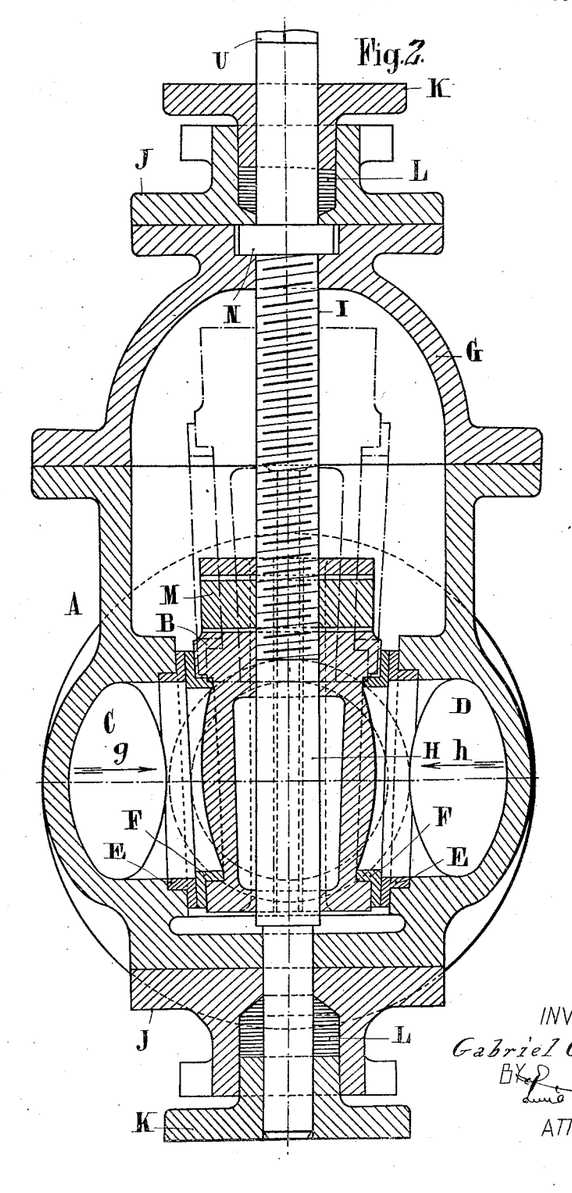
Fig. 2 is a similar section taken at right angles to Fig. 1.
Figure 3:
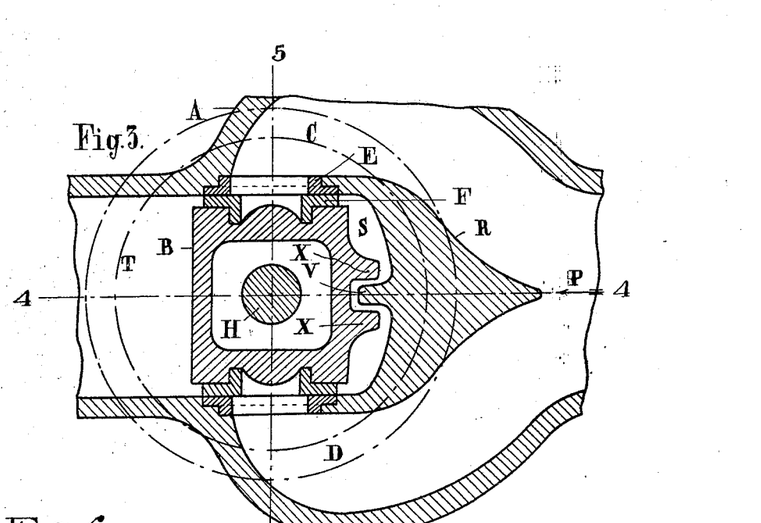
Fig. 3 is a horizontal section on line 3—3 of Fig. 1.

Referring more particularly to Figs. 1, 2 and 3, the construction therein illustrated comprises a metallic casing A fitted with two flanges which, however, may obviously be replaced by various other fastening means. The upper portion of the casing is provided with a hemispherical cap G; and at the center of the casing there is disposed the valve B which, in its closed position, is subjected to pressure on two opposite sides through the channels C and D bored in the casing, said channels being here shown as of elliptical cross-section although they may, of course, be given any other suitable shape. The surfaces of the valve in contact with the casing are provided with bronze bearings E, F in order to prevent oxidation, which would interfere with the necessary tightness, and to facilitate repairs; and these bearings are set at an incline so that the pressure within the casing at each side of the valve will thus produce an upward reaction.

The valve B is mounted on an operating rod H having a screw-threaded portion I which extends through and coacts with the threaded wall of a hole formed vertically in a nut M that is inserted through and locked in a horizontal, transverse recess in the upper part of the valve, and the latter is itself provided along its inner vertical face with a pair of spaced, longitudinal guide ribs X (Fig. 3) which receive between them a vertical tongue V formed integral with the casing. The upper portion of the rod projects through a stuffing box J at the top of the casing fitted with a cap K and suitable packing L, and ends in a squared part U to facilitate its rotation; the lower end of the rod terminating adjacent a removable closure plate Y at the bottom of the casing provided with a washer O for maintaining a tight joint.

Due to the arrangement above described, it will be apparent that rotation of the operating rod in the proper direction will cause the valve to move upwardly from the fully-closed position shown in full lines to the fully-open position indicated in dotted lines, the speed of such movement depending upon the pitch of the threads on the rod as well as on the angular speed at which the hand wheel, key or other manipulating device on the squared end of the rod is turned. In the closed position of the valve, the bronze-to-bronze contact of the bearings E, F insures tightness. The rod itself, however, is held against endwise movement during its rotation by means of a stop N which fits in a seat of the same depth as the height or thickness of the stop formed in the top of the cap G and closed by the bottom member of the stuffing box J. The combined weight of the valve and rod is exactly equal to the upward reaction or force exerted upon the valve by the pressure within the casing, as previously stated, less the displacement of the valve and the submerged portion of the rod.

The foregoing structure is more or less similar to that disclosed in my above-identified prior French patent; but in the present construction there is substituted for the substantially-flat, or slightly-rounded part R of the patented construction, the part R which, as shown in Fig. 3, is given the shape of a prow or cut-water for the reasons previously stated. This part R is cast integral with the casing A and its narrow edge is disposed midway of the casing and projects toward the axis of the inlet indicated by the arrow P, so that it will split the in-coming current of liquid or fluid into two equal parts which will flow through channels C and D in the direction of the arrows $g$ and $h$ and will impinge on the two opposite side faces of the valve when the latter is closed, thereby balancing the up-stream pressure on the valve and greatly reducing load losses. The projection V is formed on the back face of this cut-water R, and between said face and the adjacent face of the valve there is left a vertical chamber or space S (Fig. 3) which communicates at its bottom with a relatively-shallow horizontal space or chamber S' left between the bottom of the valve and the bottom of the casing, as shown in Fig. 1, said chamber S' opening into the outlet T. The cut-water R, however, is not claimed per se herein, but only in combination with the improved features previously mentioned.

The operation is substantially as follows: Assuming that valve B has been moved into its fully-open position, shown in dotted lines in Fig. 2, and that there is full pressure both up-stream and down-stream, the valve is submerged and a vertical force is produced which acts in a downward direction and is equal to the combined weight of the valve and rod less the displacement of the valve and the submerged portion of the rod. The effect of the pressure acting on the lower portion of the rod is to create a force which is equal to the preceding one but is exerted upward, or in the reverse direction. Hence there is perfect balance.

When the valve occupies its closed position, then there is full up-stream pressure: that is to say, full pressure at the inlet and within the channels C and D. There is no down-stream pressure and the valve is no longer submerged. In this position, the valve is subjected to a duplex upward reaction. On the other hand, the valve, not being submerged, has a vertical action due to its own weight as well as to the weight of the operating rod, such action being directed according to gravity, i. e., downward. In this latter instance, two actions are exerted in opposite directions; and since these two actions are equal, the valve is completely balanced in its closed position.

The balanced valve described above has been designed for the special purpose of eliminating the serious inconveniences due to lack of tightness. The chamber S' previously referred to as left beneath the valve when the latter is in its closed position permits foreign substances to collect therein without obstructing the operation of the device, such substances thereafter being drained out by the current when the valve is opened; said chamber being rendered accessible for cleaning purposes in either position of the valve by merely detaching the closure Y and its washer O. The valve may be made of various metals depending upon the particular use for which it is intended and the pressures involved, and upon the character of the liquid or fluid to be controlled. For instance, water valves used with low or medium pressures are made of cast iron, and the bearings, lock nuts and rods are made of bronze; whereas when high pressures are involved, the cast iron is preferably replaced by steel. For use with sea water or with acids, the entire device may be constructed of bronze. Where a distant control is desired, the valve, due to its perfect balance, may be operated by a low-powered motor, even if a stream passage of large diameter or a very high pressure be involved.

The special improved feature of forming the operating rod with a lower section or portion of less diameter than the upper portion, is peculiarly desirable in certain instances (where high pressures are involved, for example) where it may happen that the combined weight of the valve and rod is insufficient to compensate for the reaction exerted upon the lower portion of the rod. In that case, the rod is extended so as to project through a stuffing-box on the bottom of the casing; but if the diameter of the rod were constant, then such arrangement would completely eliminate this reaction, whereas it is desired to provide for a graduation of the reaction, so as to keep it equal under all conditions to the combined weight of the valve and rod, less the deduction for displacement. Accordingly, the diameter of the rod is reduced from a point just above where it passes through the lower stuffing-box; and the surface of the annular shoulder which is thereby formed and which is calculated in accordance with the pressure involved, is utilized to obtain perfect balance.

Figure 4:
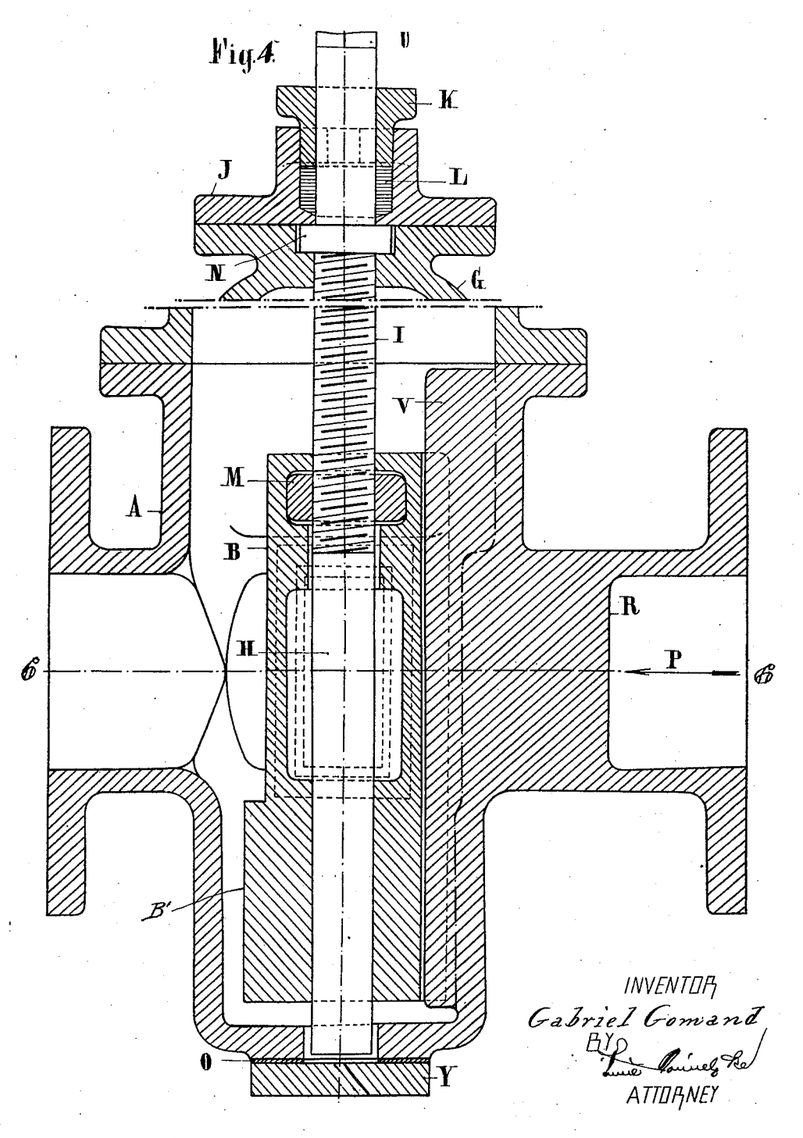
Figs. 4 and 5 are vertical sections taken at right angles to each other on lines 4—4 and 5—5, respectively, of Fig. 6 and generally similar to Figs. 1 and 2, but showing the formation on the valve proper of the lower cut-water extension or prolongation.
Figure 5:
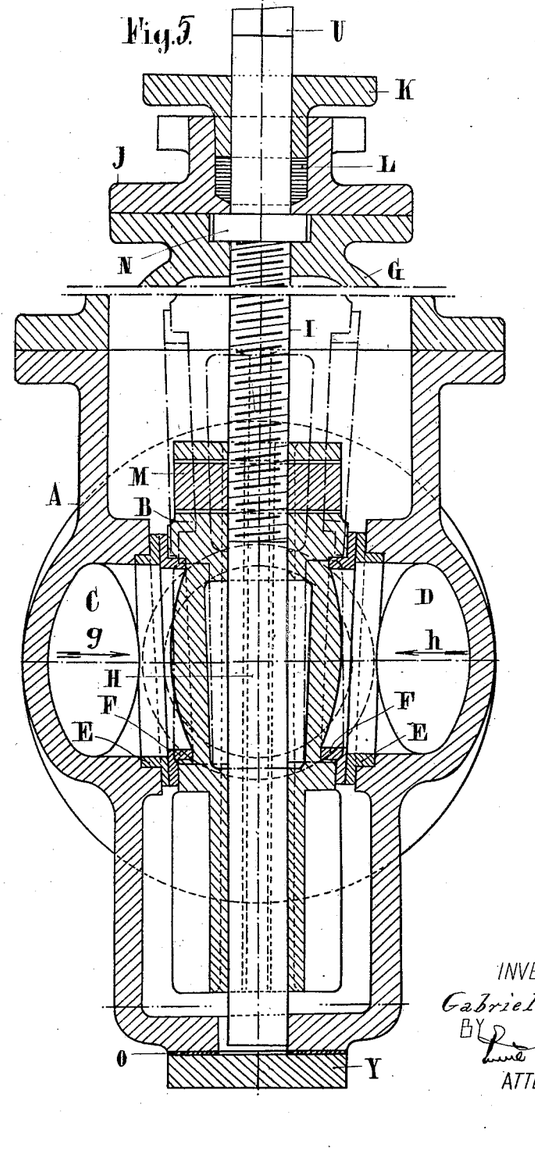
Figure 6:
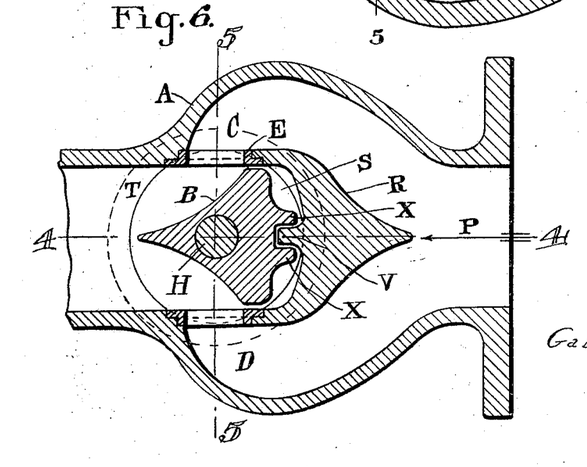
Fig 6 is a horizontal section taken substantially on line 6—6 of Figs. 4 or 7, but showing the valve as moved upward into the open position represented in dotted lines in Figs. 5 and 8 to illustrate the above-mentioned cut-water.
Figure 7:
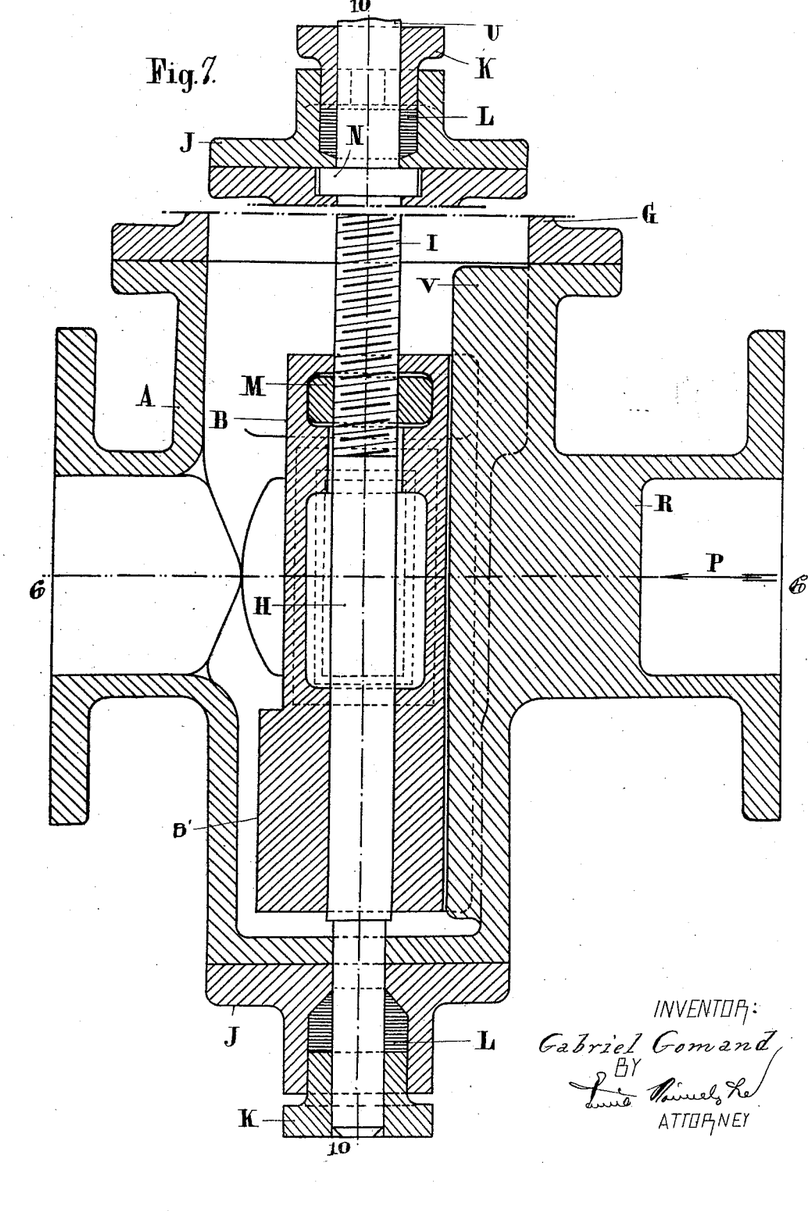
Figs. 7 and 8 are vertical sectional views similar to Figs. 4 and 5, but with the two-diameter feature applied to the valve rod.
Figure 8:
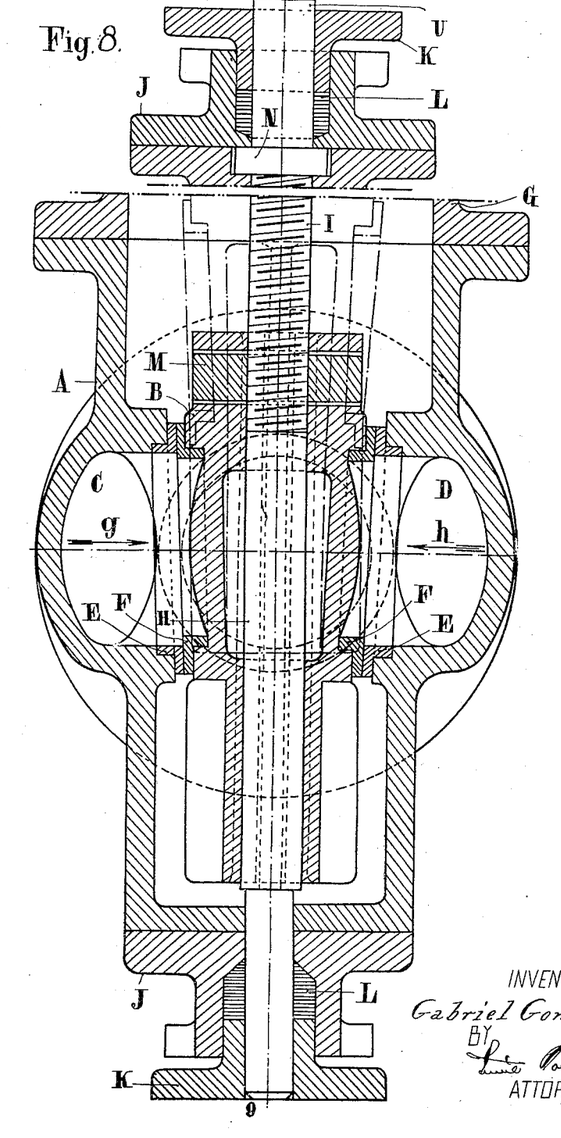

The other special development or improvement illustrated in Figs. 4—8 relates to the formation of a downward extension or prolongation B' on the valve B. This extension is given a cross-sectional shape somewhat similar to the part R so that it constitutes a lower cut-water which, however, projects in the opposite direction from part R in order to act upon the down-stream current when the valve is closed and to serve as a guide for the stream flowing beneath it when the valve is raised into open position. This feature is of importance when the device is designed for use in connection with high-speed streams (in which case the load losses would otherwise still be too great) because it reduces the losses to a considerable extent owing to the elimination of shock. The operating rod may be of constant diameter throughout, as illustrated in Figs. 4 and 5 (in which event, the bottom closure plate Y and washer O will be used), or may have the two-dimension feature applied to it, and be used with a lower stuffing-box, as represented in Figs. 7 and 8, for the reasons already stated in connection with the description of Figs. 1 and 2.

The balanced valves covered by the present invention have numerous substantial advantages: reduction of load losses, omission of by-pass and motors where high pressure are used, thorough tightness and very low cost. In the case of distant control, there is also another advantage, when used in connection with a hydro-electric power plant. In order to ensure perfect safety and to make sure that the valve will be closed in case of breakage of the electric current, it is necessary to supply the operating motor with current from a special source. In this particular instance, a storage battery must be provided, which is an adjunct of minor importance, very little power being required to operate a balanced valve.

For use with hot fluids, such as gases or vapors, the symmetrical heating of the casing and of the valve will permit any degree of expansion without interference with the operation of the valve.

I claim as my invention:

1. A balanced sluice valve, comprising a casing provided with an inlet and an outlet for the current; a pair of oppositely-curved delivery channels within the casing leading from the inlet toward the outlet; upper and lower stuffing-boxes mounted in the top and bottom of the casing; a vertically-movable valve in the casing to control communication between said channels and outlet, normally occupying a closed, lower position and receiving directly against its two side faces, when in such position, the up-stream pressure of the currents in said channels; and a vertical operating rod whereon said valve is slidably mounted projecting at opposite ends into said stuffing boxes and having its lower portion reduced to form an annular shoulder which is located between and in spaced relation to the lower face of the valve and the bottom of the casing.

2. A balanced sluice valve, comprising a casing provided with an inlet and an outlet for the current; a pair of oppositely-curved delivery channels within the casing leading from the inlet toward the outlet; a vertical cut-water within the casing having its thin edge directed toward the axis of the inlet so as to split the in-coming up-stream current in two and deflect the two portions thereof equally toward and into the channels; a vertically-movable valve in the casing to control communication between said channel and outlet, normally occupying a closed, lower position and receiving directly against its two side faces, when in such position, the up-stream pressure of the currents in said channels; upper and lower stuffing-boxes mounted in the top and bottom of the casing; and a vertical operating rod whereon said valve is slidably mounted projecting at opposite ends into said stuffing-boxes and having its lower portion reduced to form an annular shoulder which is located between and in spaced relation to the lower face of the valve and the bottom of the casing.

3. A balanced sluice valve, comprising a casing provided with an inlet and an outlet for the current; a pair of oppositely-curved delivery channels within the casing leading from the inlet toward the outlet; a vertical cut-water within the casing having its thin edge directed toward the axis of the inlet so as to split the in-coming up-stream current in two and deflect the two portions thereof equally toward and into the channels; a valve mounted for vertical movement in said casing to control communication between said channels and outlet and receiving, when in closed position, the up-stream pressure of the currents in the channels directly against its two side faces, said valve having a lower cut-water portion the thin edge of which is directed toward the axis of the outlet; and operating means for the valve.

In testimony whereof I have signed this specification in the presence of two subscribing witnesses.

GABRIEL GOMAND

Witnesses:
A. M. VARELA,
SANTIAGO ITIONALDE.